US009967734B1

(12) United States Patent
Bertz et al.

(10) Patent No.: US 9,967,734 B1
(45) Date of Patent: May 8, 2018

(54) CONTENT DELIVERY NETWORK REQUEST HANDLING IN WIRELESS COMMUNICATION SYSTEMS

(71) Applicant: Sprint Communications Company L.P., Overland Park, KS (US)

(72) Inventors: Lyle T. Bertz, Lee's Summit, MO (US); Charles Brent Hirschman, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days. days.

(21) Appl. No.: 14/551,960

(22) Filed: Nov. 24, 2014

(51) Int. Cl.
*H04W 8/08* (2009.01)
*H04W 28/02* (2009.01)
*H04W 28/08* (2009.01)
*H04W 48/18* (2009.01)

(52) U.S. Cl.
CPC ......... *H04W 8/08* (2013.01); *H04W 28/0268* (2013.01); *H04W 28/085* (2013.01); *H04W 48/18* (2013.01)

(58) Field of Classification Search
USPC .... 370/237, 229, 230, 230.1, 231, 235, 227; 709/229, 227, 250, 217, 228
See application file for complete search history.

(56) References Cited

U.S. PATENT DOCUMENTS

| 6,822,957 | B1 | 11/2004 | Schuster et al. |
| 7,010,578 | B1 | 3/2006 | Lewin et al. |
| 7,724,688 | B2 | 5/2010 | Yamada et al. |
| 8,010,626 | B2 | 8/2011 | Yue et al. |
| 8,112,531 | B2 | 2/2012 | Walsh et al. |
| 8,509,241 | B2 | 8/2013 | Li et al. |
| 8,516,529 | B2 | 8/2013 | Lajoie et al. |
| 8,576,846 | B2 | 11/2013 | Kumar et al. |
| 8,665,873 | B2 | 3/2014 | Sarikaya et al. |
| 8,700,728 | B2 | 4/2014 | Luna et al. |
| 8,719,876 | B2 | 5/2014 | Kotecha et al. |
| 8,761,056 | B2 | 6/2014 | Hyun et al. |
| 8,799,480 | B2 | 8/2014 | Kovvali et al. |
| 8,909,736 | B1 * | 12/2014 | Bosch ..................... H04L 65/00 709/217 |
| 2003/0037139 | A1 | 2/2003 | Shteyn |
| 2009/0178091 | A1 | 7/2009 | Miyamoto et al. |
| 2009/0248893 | A1 * | 10/2009 | Richardson ........... H04L 67/327 709/239 |

(Continued)

FOREIGN PATENT DOCUMENTS

| CN | 101674288 | 3/2010 |
| EP | 2012501 | 1/2009 |

(Continued)

*Primary Examiner* — Edan Orgad
*Assistant Examiner* — Saumit Shah

(57) ABSTRACT

A wireless access network receives Content Delivery Network (CDN) registration data transferred by a plurality of CDNs. The registration data associates individual wireless communication device identifiers for individual wireless communication devices with individual CDNs. The wireless access network receives CDN signaling from an external data system indicating one of the individual wireless communication device identifiers for an individual one of the wireless communication devices. In response, the wireless access network processes the individual wireless communication device identifier from the external system to identify an associated CDN. The wireless access network then transfers at least a portion of the CDN signaling for delivery to the identified CDN.

6 Claims, 6 Drawing Sheets

(56) References Cited

U.S. PATENT DOCUMENTS

| | | |
|---|---|---|
| 2010/0130122 A1 | 5/2010 | Sridhar et al. |
| 2012/0005372 A1 | 1/2012 | Sarikaya et al. |
| 2012/0184258 A1 | 7/2012 | Kovvali et al. |
| 2012/0226770 A1 | 9/2012 | Schapira et al. |
| 2012/0239785 A1 | 9/2012 | Pazos |
| 2012/0246273 A1 | 9/2012 | Bornstein et al. |
| 2013/0086279 A1* | 4/2013 | Archer ............... H04L 69/14 709/233 |
| 2013/0094445 A1* | 4/2013 | De Foy .............. H04L 45/021 370/328 |
| 2013/0227284 A1 | 8/2013 | Pfeffer et al. |
| 2013/0262628 A1* | 10/2013 | Sivasubramanian ............ H04L 61/1511 709/217 |
| 2014/0036897 A1 | 2/2014 | Frydman et al. |
| 2014/0052824 A1 | 2/2014 | Fall |
| 2014/0155043 A1* | 6/2014 | Gell ................. H04W 4/003 455/414.1 |
| 2014/0179301 A1 | 6/2014 | Harris |
| 2014/0192697 A1 | 7/2014 | Anchan et al. |
| 2014/0245359 A1* | 8/2014 | De Foy ............ H04N 21/6181 725/62 |

FOREIGN PATENT DOCUMENTS

| | | |
|---|---|---|
| EP | 2716011 | 12/2012 |
| WO | 2012167106 | 12/2012 |
| WO | 2013113181 | 8/2013 |
| WO | 2013120356 | 8/2013 |
| WO | 2013134211 | 9/2013 |

\* cited by examiner

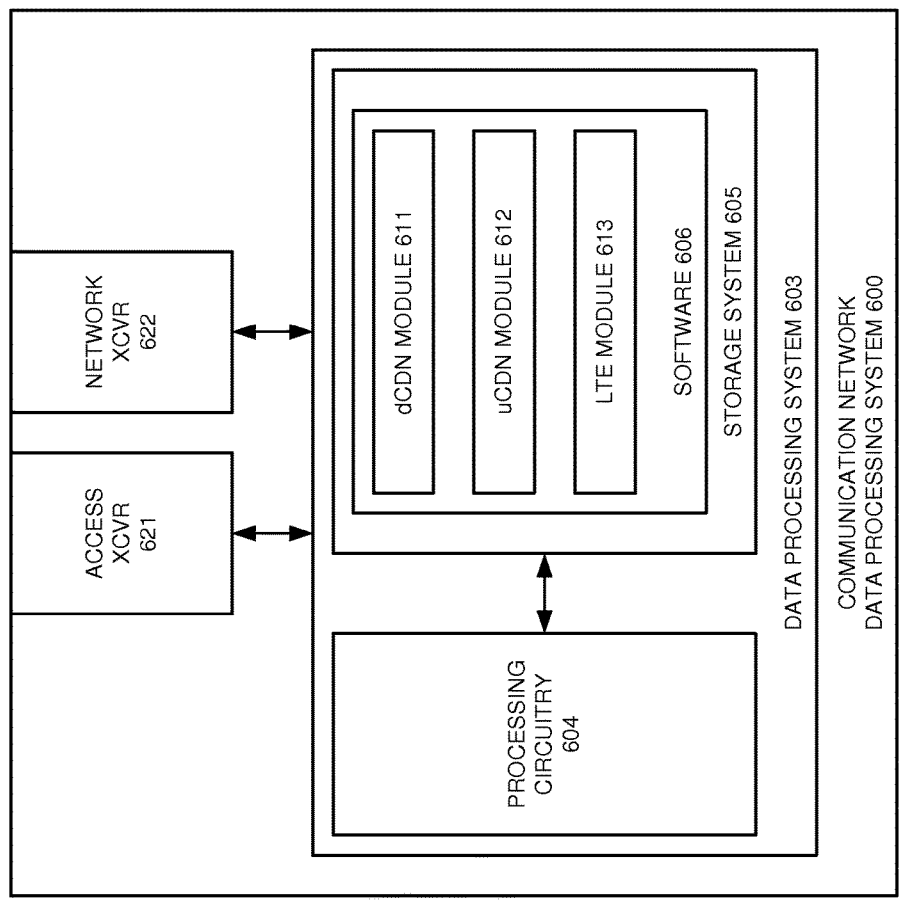

CONTENT DELIVERY NETWORK REQUEST HANDLING IN WIRELESS COMMUNICATION SYSTEMS

TECHNICAL BACKGROUND

Content Delivery Networks (CDNs) host media content like movies, music, and other data files. For some media content transfers, two CDNs are used: an upstream CDN (uCDN) and a downstream CDN (dCDN). The uCDN collects media content and/or associated content metadata from various content sources. The uCDN selects a dCDN to deliver the media content to a given user device. The dCDN selection is often based on the proximity and transport efficiency of the selected dCDN to a given user device. The interactions between the uCDN and the dCDN occur over CDN Interface (CDNI) signaling. The CDNI signaling indicates control, footprint, request routing, metadata, and logging information.

Internet Protocol (IP) access networks are often used as dCDNs due to their proximity to the user devices. Exemplary IP access networks include wireless communication networks, cable television networks, fiber optic data networks, Ethernet access systems, and satellite communication systems. Wireless communication networks, such as Long Term Evolution (LTE) systems, often have associated equipment at the user location. For example, many users have wireless femtocells and Local IP Access (LIPA) systems that are coupled to the Internet to enhance wireless coverage in their home, business, or school.

In addition to wireless network equipment, many users also deploy Local Area Networks (LANs) to transfer IP communications over protocols like Wireless Fidelity (Wifi) and Ethernet. The LANs may be coupled to various media servers that store media content. For example, a Universal Plug and Play (uPnP) server may provide video content to a user television over the LAN.

CDNs of various sizes and capabilities are deployed across these diverse communication environments. CDNs are typically found in LTE networks and other Internet Service Providers (ISPs), but CDNs are also present in local systems, such as femtocells, Wifi hotspots, LTE LIPA systems, and Ethernet LANs. CDNs may also reside within smartphones, tablet computers, and the like.

Unfortunately, the exchange of CDNI signaling and the level CDN interaction is not effective in this environment. The selection of dCDNs in these local environments in coordination with wireless network CDNs, landline ISP CDNs, and core Internet CDNs is not efficient or robust. This array of local dCDNs remains underutilized by core Internet CDNs.

TECHNICAL OVERVIEW

A wireless access network receives CDN registration data transferred by a plurality of CDNs. The registration data associates individual wireless communication device identifiers for individual wireless communication devices with individual ones of the CDNs. The wireless access network receives CDN signaling from an external data system indicating one of the wireless communication device identifiers for one of the wireless communication devices. In response, the wireless access network processes the wireless communication device identifier from the external system to identify an associated CDN. The wireless access network then transfers at least a portion of the CDN signaling for delivery to the identified CDN.

DESCRIPTION OF THE DRAWINGS

FIG. 6 illustrates a data processing system to handle content-delivery requests from an external data system using wireless device IDs.

DETAILED DESCRIPTION

Figure 1:
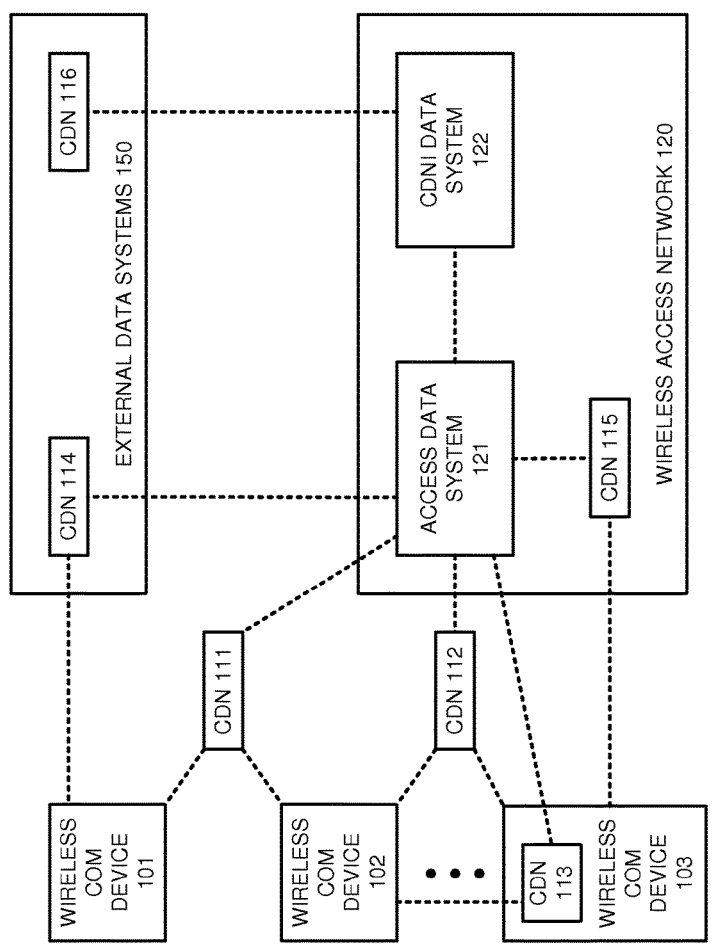
FIGS. 1-2 illustrate a communication system to handle content-delivery requests from an external data system using wireless device IDs.
Figure 2:
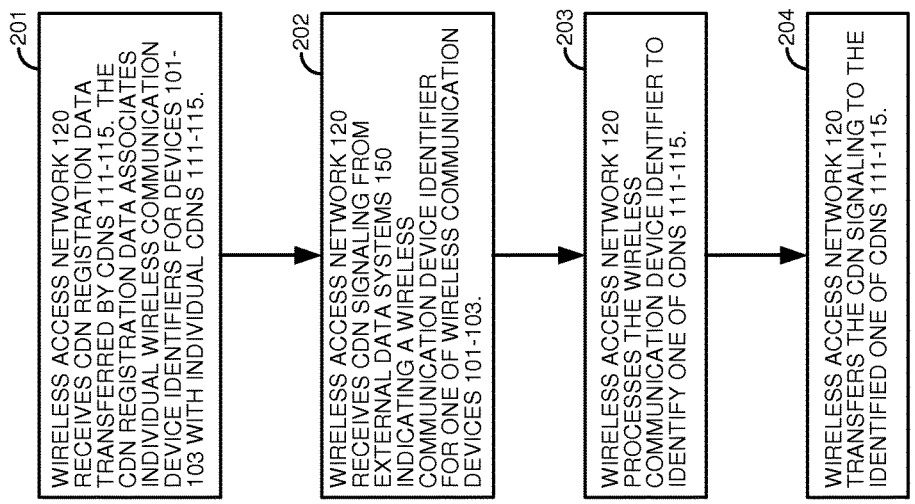

FIGS. 1-2 illustrate communication system 100 to handle content-delivery requests from external data systems 150 using wireless device Identifiers (IDs). The content comprises video, audio, graphics, data objects, and/or some other type of data block. The request comprises a content redirection, content transfer, control trigger, data query, log action, and/or some other type of content-delivery data task. The wireless device IDs comprise International Mobile Equipment Identifiers (IMEIs), International Mobile Subscriber Identifiers (IMSIs), Internet Protocol (IP) address data, domain names, or some other code individually associated with devices 101-103.

Referring to FIG. 1, communication system 100 comprises wireless communication devices 101-103, Content Delivery Networks (CDNs) 111-116, wireless access network 120, and external data systems 150. Wireless access network 120 includes access data system 121, CDN Interface (CDNI) data system 122, and CDN 115. Wireless communication device 103 includes CDN 113. External data systems 150 include CDNs 114 and 116.

Wireless communication devices 101-103 comprise phones, computers, media players, or some other apparatus having radio, media, and data processing components. Individual wireless communication devices 101-103 each have one or more wireless device IDs. CDNs 111-116 comprise media servers having at least some CDNI capabilities such as logging, pre-positioning, control triggering, request routing, and the like. Access data system 121 comprises wireless base stations, packet gateways, routers, and the like. CDNI data system 122 comprises a computer and communication platform having CDNI software and data structures to exchange CDN signaling with CDNs 111-116.

In operation, access data system 121 receives CDN registration data transferred by CDNs 111-115. The CDN registration data associates the individual wireless communication device IDs for devices 101-103 with one or more individual CDNs 111-115. Access data system 121 transfers the CDN registration data to CDNI data system 122. CDNI data system 122 also receives CDN signaling from external data systems 150 indicating one of the wireless communication device IDs for one of wireless communication devices 101-103. In response, CDNI data system 122 processes the wireless communication device ID from external data systems 150 to identify an associated one of CDNs 111-115. Access data system 121 then transfers at least a portion of the CDN signaling to the identified one of CDNs 111-115.

For example, wireless communication device 102 may register with CDN 112 using its IMSI. CDN 112 could forward this CDN registration information to CDNI data system 122 through access data system 121. If CDNI data system 122 receives a CDN request from CDN 116 indicating the IMSI for wireless communication device 102, then CDMI data system 122 would identify CDN 112 based on the registration data and forward the CDN request to CDN 112 over access data system 121.

In some examples, CDNs 111-115 receive the CDN registration data from wireless communication devices 101-103 before forwarding the registration data to wireless access network 121 and CDNI data system 122. In other examples, a proxy system may register wireless devices 101-103 with CDNs 111-115. In some examples, external data systems 150 receive content requests from wireless communication devices 101-103 and responsively transfer the CDN signaling to wireless access network 120 to service these content requests.

In some examples, the CDN registration data indicates CDNI capabilities for CDNs 111-115. In some of these cases, wireless access network 120 processes the wireless communication device ID and the CDNI registration capabilities of the available CDN 111-115 to select a CDN. The selected CDN might be the closest CDN having adequate CDNI capabilities. The selected CDN might be the CDN having the best CDNI capabilities. The CDNI capabilities that are reported for CDN selection may include: request routing, logging, pre-positioning, control triggering, available data communication systems for content-delivery, and/or some other CDNI feature.

In some examples, CDNI data system 122 processes the wireless communication device ID from external data systems 150 to identify a Quality-of-Service (QoS) level. CDNI data system 122 transfers the identified QoS level to a Packet Data Network Gateway (P-GW). The P-GW uses the QoS identified by CDNI data system 122 to control the content transfer to the selected CDN and/or wireless communication device. In some scenarios, the QoS identified by CDNI data system 122 is delivered to the P-GW through a Policy, Charging, and Rules Function (PCRF).

Advantageously, external data systems 150 are able to transfer CDN signaling to a virtual CDN comprised of CDNs 111-115, because wireless access network 120 routes the CDN signaling to the appropriate CDN based on wireless device ID.

Referring to FIG. 2, wireless access network 120 receives CDN registration data transferred by CDNs 111-115 (201). The CDN registration data associates individual wireless communication device IDs for devices 101-103 with individual CDNs 111-115. For example, wireless access network 120 might receive CDN registration data from CDN 114 indicating the IMEI of wireless communication device 101—based on a previous CDN registration session between wireless device 101 and CDN 114. Exemplary device identifications include IMSIs, IMEIs, IP addresses, Electronic Serial Numbers (ESNs), Media Access Control (MAC) addresses, IP network prefixes, and the like.

Wireless access network 120 receives CDN signaling from external data systems 150 indicating a wireless communication device ID for one of wireless communication devices 101-103 (202). For example, wireless access network 120 might receive a CDNI redirect request from external CDN 116 indicating the IPv6 network prefix for wireless communication device 103. In response, wireless access network 120 processes the IPv6 network prefix to identify one of CDNs 111-115 (203). In some cases, wireless access network 120 maintains a data structure to associate wireless device IDs with their registered CDNs and related CDNI capabilities, footprint, and content inventory. Wireless access network 120 uses the data structure to route CDNI signaling from external CDN 116 to local CDNs 111-115.

Wireless access network 120 transfers the CDN signaling to the identified one of CDNs 111-115 (204). For example, wireless access network 120 may transfer pre-positioning data to CDN 112 for subsequent delivery to wireless communication device 102. Advantageously, external systems like CDN 116 may transfer CDN signaling to a virtual CDN by allowing wireless access network 120 to route this CDN signaling to the appropriate CDN.

Figure 3:
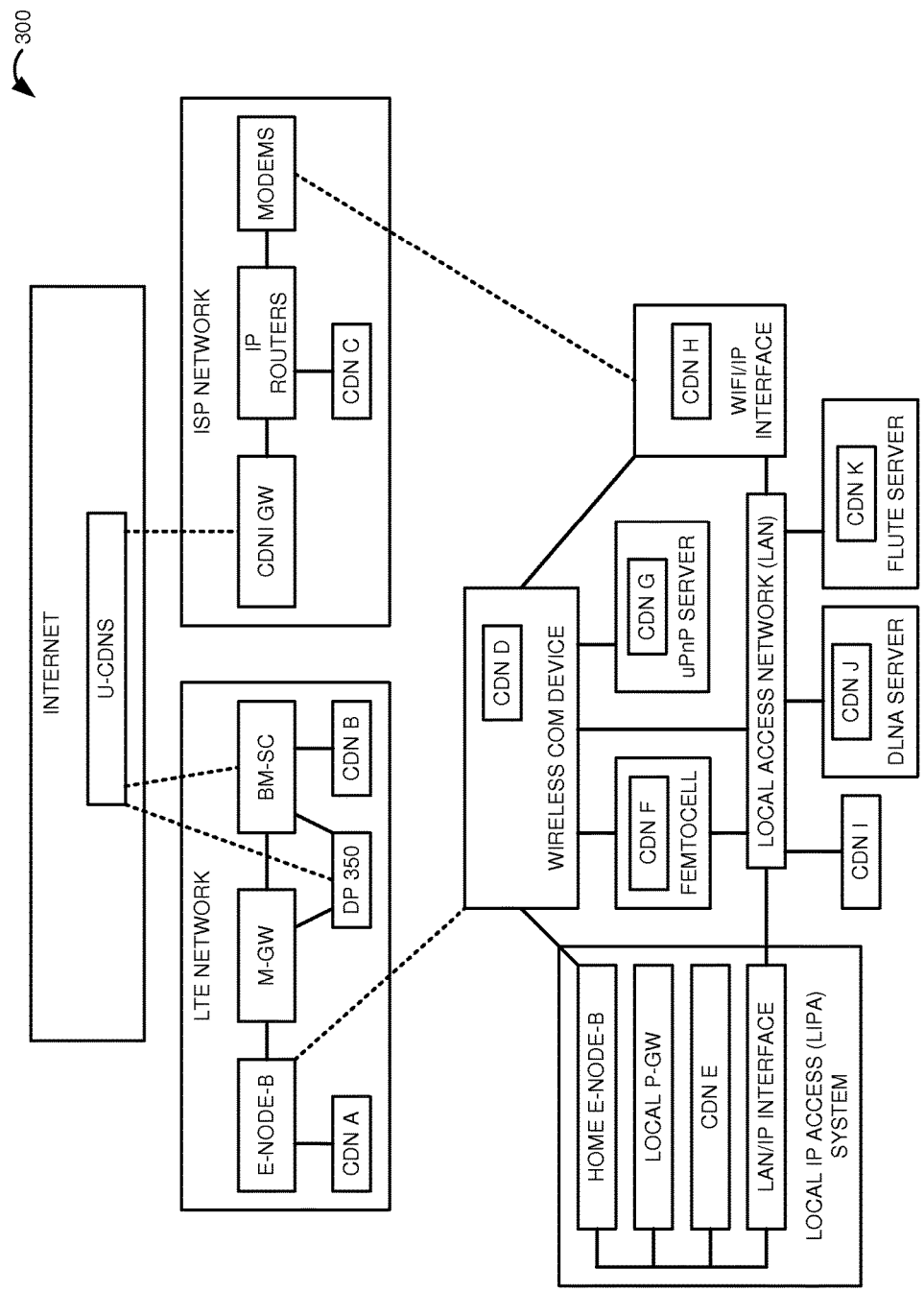
FIGS. 3-5 illustrate a communication system to route CDNI signaling from external CDNs to local CDNs using wireless device IDs.
Figure 4:
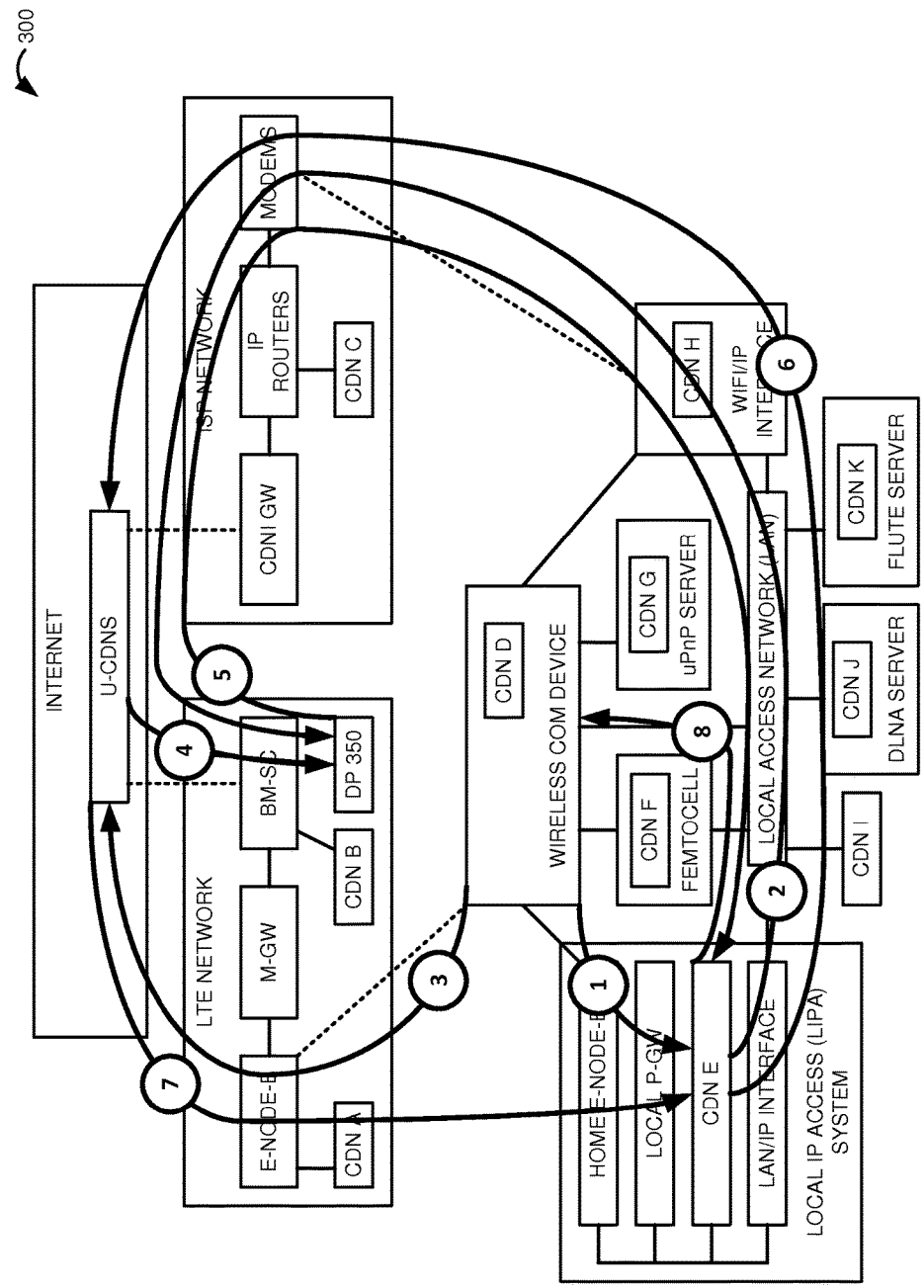
Figure 5:
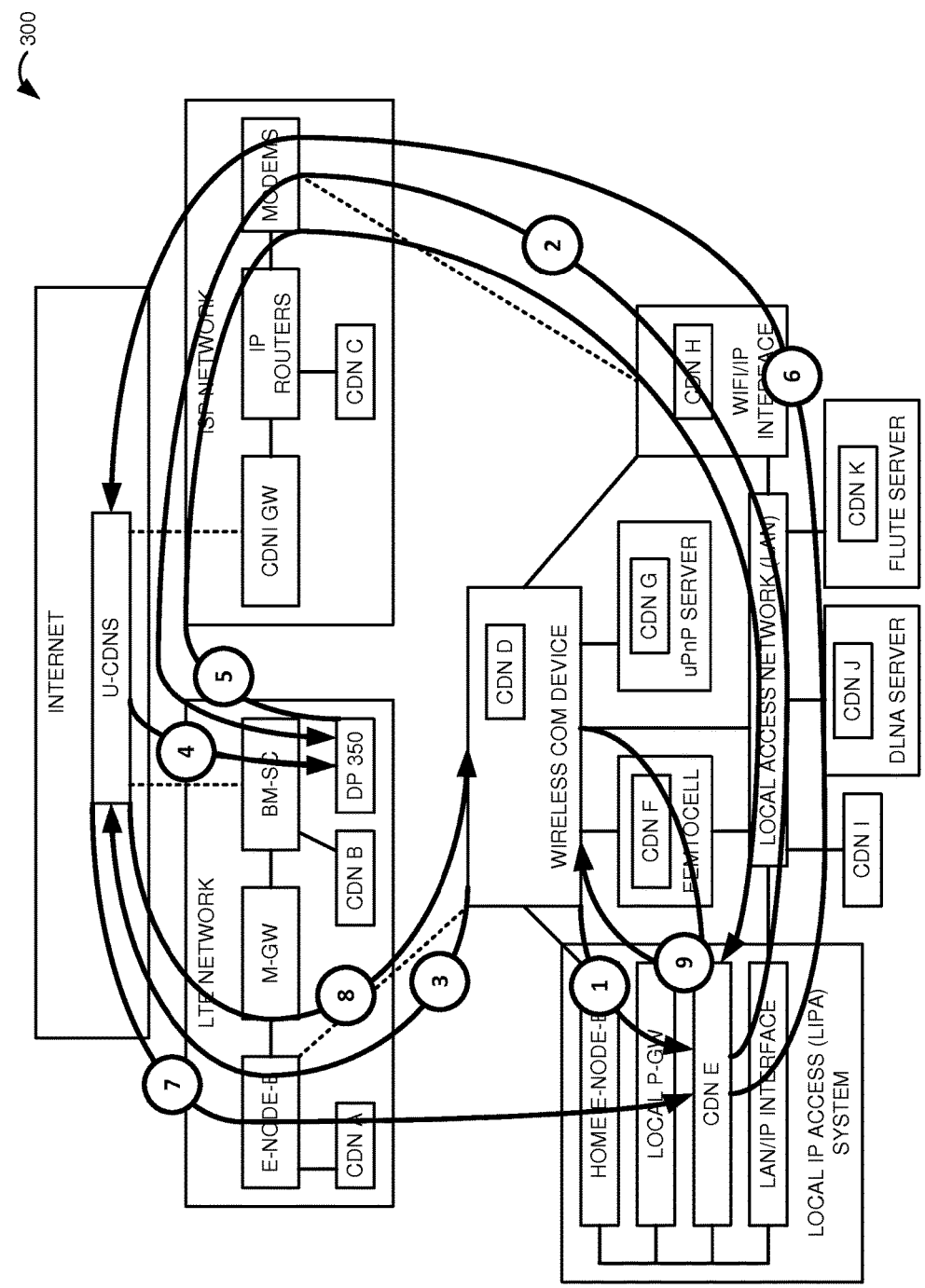

FIGS. 3-5 illustrate communication system 300 to route CDN signaling from external CDNs to local CDNs using wireless device IDs. Communication system 300 is an example of communication system 100, although system 100 may have alternative configurations and operations. Communication system 300 comprises the Internet, a Long Term Evolution (LTE) network, Internet Service Provider (ISP) network, and various local data systems including a wireless communication device.

The Internet comprises numerous upstream Content Delivery Networks (uCDNs). The LTE network comprises an eNodeB, Multimedia Broadcast Multicast System (MBMS) Gateway (M-GW), Broadcast Multicast Service Center (BM-SC), CDN A, CDN B, and Data Processor (DP) 350. DP 350 may be integrated within or distributed across various LTE network elements, including the BM-SC and M-GW. The ISP network comprises IP modems, routers, CDNI Gateway (GW), and CDN C. The uCDNs on the Internet communicate with the BM-SC in the LTE network and with the CDNI GW in the ISP network. The uCDNs on the Internet also communicate with DP 350—possibly through the BM-SC.

The local systems comprise the wireless communication device, an LTE Local IP Access (LIPA) system, Local Area Network (LAN), femtocell, universal Plug and Play (uPnP) server, Wifi/IP interface, CDN I, Digital Living Network Alliance (DLNA) server, and File Transfer over Unidirectional Transport (FLUTE) server. The LIPA system includes a Home eNodeB (HeNB), local service/Packet Gateway (P-GW), CDN E, and LAN/IP interface. The wireless communication device is coupled to the LIPA HeNB, LTE network eNodeB, femtocell, uPnP server, and Wifi/IP interface. The LAN interconnects the LTE LIPA system, femtocell, wireless communication device, Wifi/IP interface, CDN I, DLNA server, and FLUTE server. The Wifi/IP interface is coupled to one or more modems in the ISP network.

CDNs A-K are located in various elements of communication system 300 as follows: CDN A & B in the LTE network, CDN C in the ISP network, CDN D in the wireless communication device, CDN E in the LIPA system, CDN F in the femtocell, CDN G in the uPnP server, CDN H in the Wifi/IP interface, CDN I on the LAN, CDN K in the DLNA server. CDNs A-K host media content and have differing levels of CDNI capability. Advantageously, communication system 300 allows the uCDNs on the Internet to treat numerous CDNs A-K as a single virtual downstream CDN (dCDN) by routing CDN signaling between the uCDNs and the dCDNs based on wireless device IDs.

Referring to FIG. 4 and in a first operation, the wireless communication device registers with CDN E over the LAN or HeNB. The wireless device provides its IMSI to CDN E during the CDN registration.

In a second operation, CDN E transfers the IMSI from the wireless device registration data to DP 350 over the LAN, ISP network, and Internet, although the LTE network could be used. CDN E also indicates its own metadata like footprint, CDNI capabilities, content-delivery interfaces, content inventory, and the like. The other local CDNs also report other wireless device registrations to DP 350 in a similar manner.

In a third operation, the wireless communication device transfers a content request over the LTE network to one of the uCDNs on the Internet. The content request indicates the IMSI of the wireless device and a Uniform Resource Identifier (URI) for the content.

In a fourth operation, the uCDN processes the IMSI to identify the LTE network. In some examples, the uCDN associates various client IMSIs with various LTE and ISP networks. In other examples, the wireless communication device identifies the LTE network along with its IMSI in the content request. The identified network ID could be a Global Cell Identifier (GCI), Public Land Mobile Network (PLMN) ID, IP footprint, network prefix, and the like. The uCDN transfers a content-delivery request indicating the IMSI to the identified LTE network. The LTE network directs the content-delivery request to DP 350.

In a fifth operation, DP 350 processes the IMSI from the uCDN request to select CDN E based on the previous CDN E registration by the wireless communication device. If multiple CDNs are available for the wireless device, then DP 350 may select one of these CDNs based on additional factors like proximity, content-delivery interfaces, content inventory, CDNI capability, and the like. For example, DP 350 may select a CDN that has CDNI request routing capability over a CDN that does not, and the selected CDN may have the highest level of request routing ability. The content-delivery interfaces may prioritized for optimal CDN selection as follows: enhanced Multimedia Broadcast Multicast Service (eMBMS), LTE LIPA, FLUTE, Ethernet, Wifi, Near-Field Communication (NFC), and Real Time Protocol (RTP). DP 350 transfers the content-delivery request from the uCDN to CDN E. This request transfer traverses the ISP network, although the LTE network could be used.

In a sixth operation, CDN E processes the content-delivery request and responds to the uCDN request in the affirmative. The affirmative content-delivery response may be directed to the uCDN through DP 350 and/or the LTE network, although it traverses the ISP network in this example.

In a seventh operation, the uCDN transfers media content for the URI to CDN E. This content transfer uses the LTE network, although the ISP network could be used. Additional messaging may be used to effect this content transfer as well. For example, the uCDN may signal a content-delivery Quality-of-Service (QoS) for provision and enforcement within the LTE network.

In an eighth operation, CDN E transfers the media content to the wireless communication device over the LAN, although other communication channels could be used. Advantageously, the uCDNs on the Internet may conveniently use any of CDNs A-K in a similar manner. Thus, DP 350 creates a robust CDN routing system where the uCDNs on the Internet leave dCDN selection for wireless devices to the LTE network.

FIG. 5 illustrates an alternative operational sequence to that of FIG. 4. Referring to FIG. 5 and in a first operation, the wireless communication device registers with CDN E over the LAN or HeNB. The wireless device provides its IMSI to CDN E during the CDN registration.

In a second operation, CDN E transfers the IMSI from the wireless device registration data to DP 350 over the ISP network and Internet, although the LTE network could be used. CDN E also indicates its own metadata like footprint, CDNI capabilities, content-delivery interfaces, content inventory, and the like. The other local CDNs also report other wireless device registrations to DP 350 in a similar manner.

In a third operation, the wireless communication device transfers a content request over the LTE network to one of the uCDNs on the Internet. The content request indicates the IMSI of the wireless device and a Uniform Resource Identifier (URI) for the content.

In a fourth operation, the uCDN processes the IMSI to identify the LTE network. In some examples, the uCDN associates various client IMSIs with various LTE and ISP networks. In other examples, the wireless communication device identifies the LTE network along with its IMSI in the content request. The identified network ID could be a Global Cell Identifier (GCI), Public Land Mobile Network (PLMN) ID, IP footprint, network prefix, and the like. The uCDN transfers a content-delivery request indicating the IMSI to the identified LTE network. The LTE network directs the content-delivery request to DP 350.

In a fifth operation, DP 350 processes the IMSI from the uCDN request to select CDN E based on the previous CDN E registration by the wireless communication device. If multiple CDNs are available for the wireless device, then DP 350 may select one of these CDNs based on additional factors like proximity, content-delivery interfaces, content inventory, CDNI capability, and the like. For example, DP 350 may select a CDN based on its data access interfaces to the wireless communication device. CDN E could be selected because it has multiple local data interfaces (HeNB and LAN) to the wireless communication device and multiple network interfaces (LTE and ISP) to the uCDN and/or DP 350. DP 350 transfers the content-delivery request from the uCDN to CDN E. This request transfer traverses the ISP network and LAN, although the LTE network could be used.

In a sixth operation, CDN E processes the content-delivery request and responds to the uCDN request in the affirmative. The affirmative content-delivery response may be directed to the uCDN through DP 350 and/or the LTE network, although the affirmative response traverses the ISP network in this example.

In a seventh operation, the uCDN transfers media content for the URI to CDN E. This content transfer uses the LTE network, although the ISP network and LAN could be used. Additional messaging may be used to effect this content transfer as well. For example, the uCDN may signal a content-delivery QoS for provision and enforcement within the LTE network.

In an eighth operation, the uCDN transfers a redirect to the wireless communication device. The redirect uses the LTE network (and may route through DP 350) but the ISP network could be used as well.

In a ninth operation, the wireless communication device transfers the redirect to CDN E, and CDN E transfers the media content to the wireless communication device over the LAN. Other communication channels could be used.

The uCDN may use any of CDNs A-K in a similar manner. DP 350 creates a robust CDN routing system where the uCDNs on the Internet leave dCDN selection to the LTE network based on wireless device IDs. Thus, communication system 300 provides single virtual and robust dCDN to the uCDNs on the Internet.

FIG. 6 illustrates communication network data processing system 600 to handle content-delivery requests from an external data system using wireless device IDs. Communication network data processing system 600 is an example of CDNI data system 122 and DP 350, although these systems may use alternative configurations and operations. Communication network data processing system 600 comprises access transceiver 621 and network transceiver 622. Communication transceivers 621-622 comprise communication components, such as ports, amplifiers, filters, modulators, signal processors, and the like.

Communication network data processing system 600 comprises data processing system 603. Processing system 603 comprises processing circuitry 604 and storage system 605. Storage system 605 stores software 606. Software 606 includes software modules 611-613. Some conventional aspects of communication network data processing system 600 are omitted for clarity, such as power supplies, enclosures, and the like. Communication network data processing system 600 may be centralized or distributed and may include various virtualized components.

In processing system 603, processing circuitry 604 comprises circuit boards, integrated circuitry, and associated electronics. Storage system 605 comprises non-transitory, machine-readable, data storage media, such as flash drives, disc drives, memory circuitry, servers, and the like. Software 606 comprises machine-readable instructions that control the operation of processing circuitry 604 when executed. Software 606 includes software modules 611-613 and may also include operating systems, applications, data structures, virtual machines, utilities, databases, and the like. All or portions of software 606 may be externally stored on one or more storage media, such as flash drives, discs, servers, and the like.

When executed by processing circuitry 604, dCDN module 611 directs circuitry 604 to receive CDN registration information indicating local CDNs and their associated wireless communication device IDs, CDNI capabilities, footprints, content inventories, and the like. When executed by processing circuitry 604, dCDN module 611 also directs circuitry 604 to transfer uCDN requests to local dCDNs. When executed by processing circuitry 604, uCDN module 612 directs circuitry 604 to exchange CDN signaling with uCDNs on the Internet or other external network. When executed by processing circuitry 604, uCDN module 612 also directs circuitry 604 to select a dCDN based on the registration data and perhaps other metadata. When executed by processing circuitry 604, LTE module 613 directs circuitry 604 to transmit QoS and other instructions to LTE network elements to effect media content and CDNI signaling transfers through the LTE network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to control content delivery to a wireless communication device, the method comprising:
    the wireless communication network associating (downstream Content Delivery Networks) dCDNs with dCDN Quality-of-Service (QoS) levels;
    responsive to the wireless communication device registering with the dCDNs, the wireless communication network associating the dCDNs with an International Mobile Subscriber Identifier (IMSI) for the wireless communication device;
    the wireless communication network receiving CDN signaling transferred by an upstream CDN (uCDN) that indicates the IMSI for the wireless communication device and responsively selecting one of the dCDNs based on the dCDN QoS levels for the dCDNs associated with the IMSI for the wireless communication device; and
    the wireless communication network transferring the CDN signaling for delivery to the selected one of the dCDNs.

2. The method of claim 1 further comprising
    the wireless communication network associating the dCDNs with CDN Interface (CDNI) capabilities; and
    the wireless communication network selecting the one of the dCDNs comprises the wireless communication network selecting the one of the dCDNs based on the dCDN QoS levels and the CDNI capabilities for the dCDNs associated with the IMSI for the wireless communication device.

3. The method of claim 1 further comprising
    the wireless communication network associating the dCDNs with content inventories; and
    the wireless communication network selecting the one of the dCDNs comprises the wireless communication network selecting the one of the dCDNs based on the dCDN QoS levels and the content inventories for the dCDNs associated with the IMSI for the wireless communication device.

4. A method of operating a wireless communication network to control content delivery to a wireless communication device, the method comprising:
    the wireless communication network associating (downstream Content Delivery Networks) dCDNs with dCDN Quality-of-Service (QoS) levels;
    responsive to the wireless communication device registering with the dCDNs, the wireless communication network associating the dCDNs with an International Mobile Equipment Identifier (IMEI) for the wireless communication device;
    the wireless communication network receiving CDN signaling transferred by an upstream CDN (uCDN) that indicates the IMEI for the wireless communication device and responsively selecting one of the dCDNs based on the dCDN QoS levels for the dCDNs associated with the IMEI for the wireless communication device; and
    the wireless communication network transferring the CDN signaling for delivery to the selected one of the dCDNs.

5. The method of claim 4 further comprising
    the wireless communication network associating the dCDNs with CDN Interface (CDNI) capabilities; and
    the wireless communication network selecting the one of the dCDNs comprises the wireless communication network selecting the one of the dCDNs based on the dCDN QoS levels and the CDNI capabilities for the dCDNs associated with the IMEI for the wireless communication device.

6. The method of claim 4 further comprising
    the wireless communication network associating the dCDNs with content inventories; and
    the wireless communication network selecting the one of the dCDNs comprises the wireless communication network selecting the one of the dCDNs based on the dCDN QoS levels and the content inventories for the dCDNs associated with the IMEI for the wireless communication device.

* * * * *